April 20, 1948. L. J. ROUSSEAU 2,440,157
DRIER FOR MOTOR VEHICLE WASHING AND CLEANING APPARATUS
Filed Aug. 19, 1944 3 Sheets-Sheet 1

Inventor
Leo J. Rousseau
By Barthel + Bugbee
Attorneys

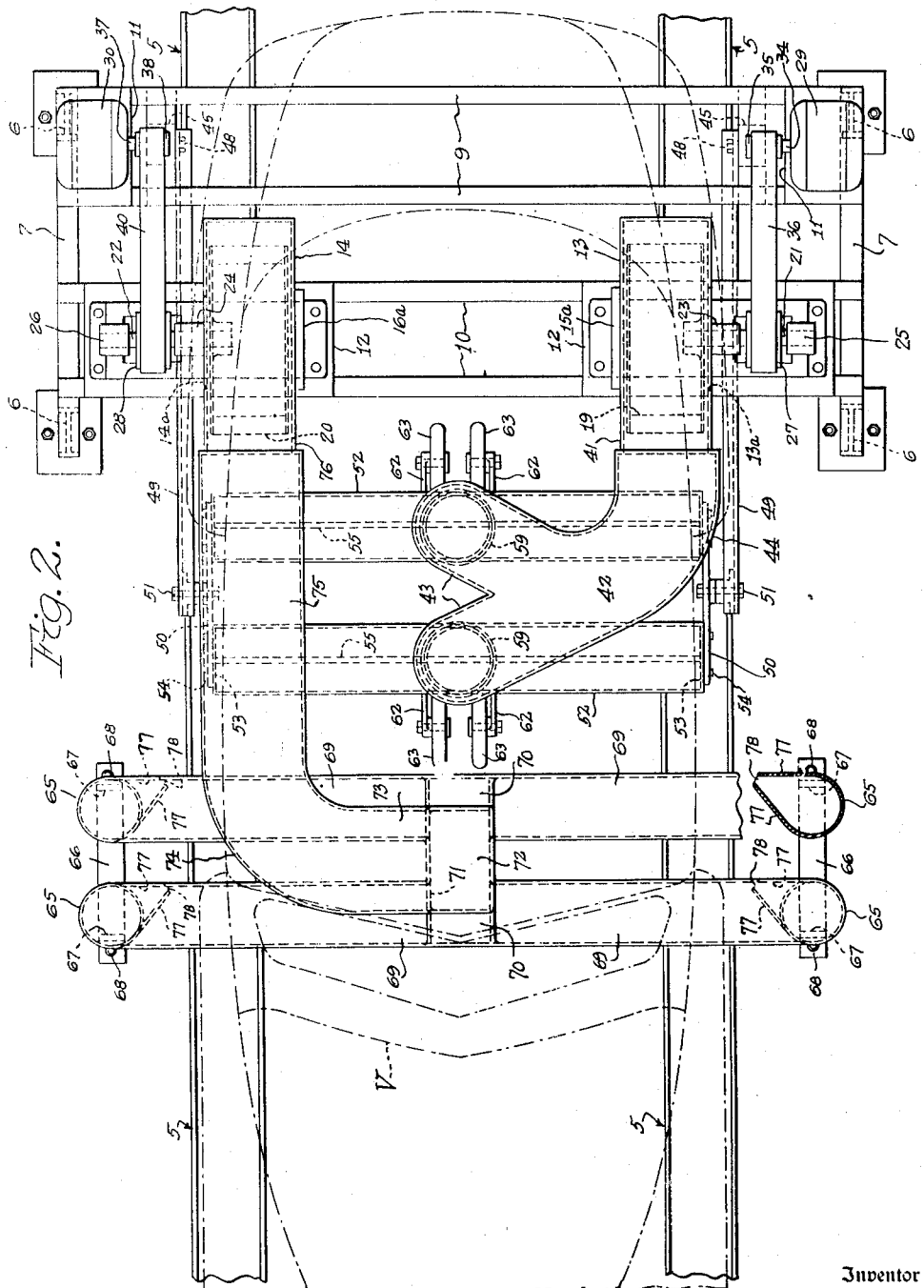

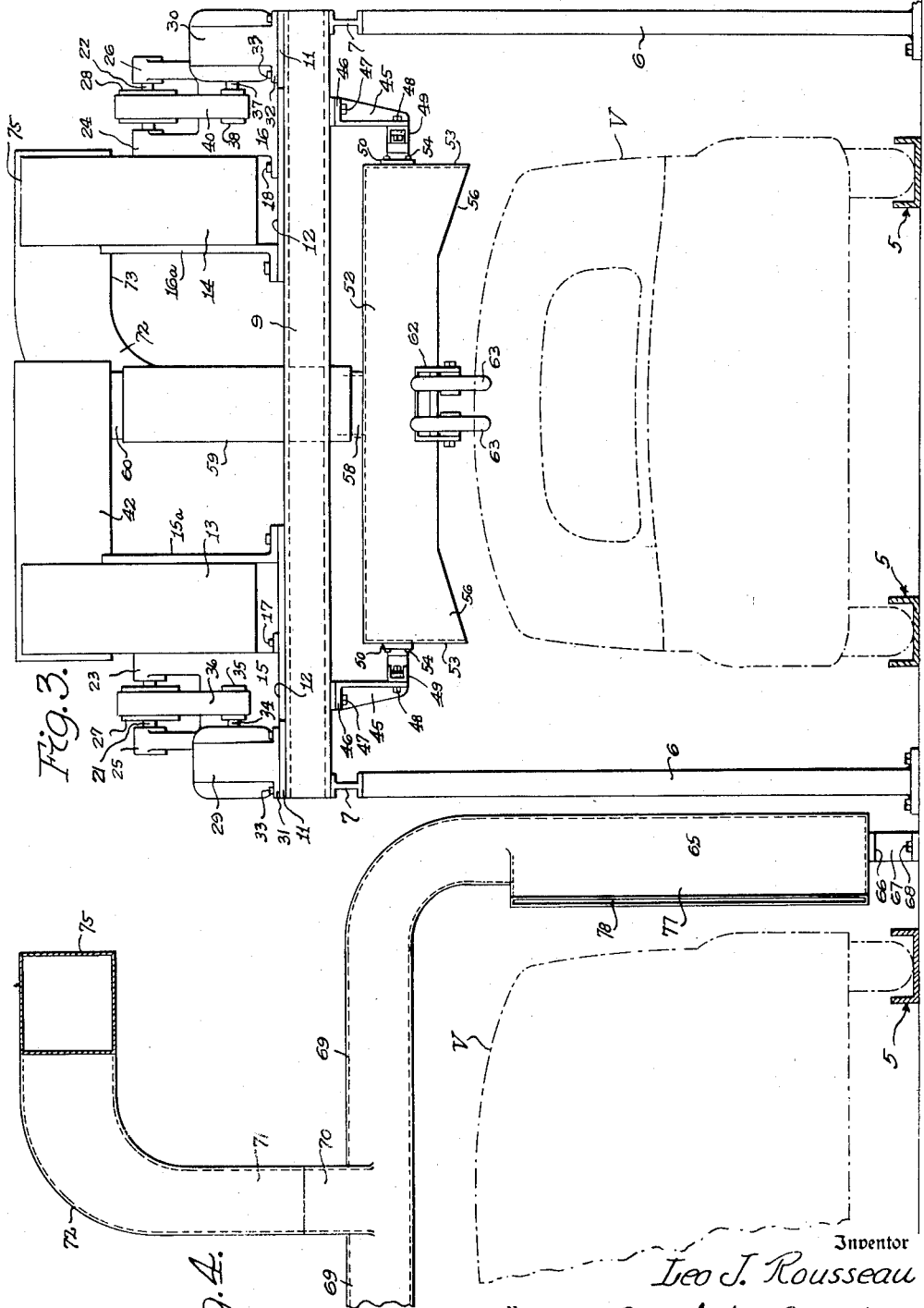

Patented Apr. 20, 1948

2,440,157

UNITED STATES PATENT OFFICE 2,440,157

DRIER FOR MOTOR VEHICLE WASHING AND CLEANING APPARATUS

Leo J. Rousseau, Grosse Pointe Park, Mich., assignor, by mesne assignments, to Minit-Man, Inc., Detroit, Mich., a corporation of Michigan Application August 19, 1944, Serial No. 550,241

7 Claims. (Cl. 34—229)

The present invention relates to improvements in cleaning and drying apparatus for motor vehicle bodies and tops.

The primary object of the invention is to provide an apparatus for drying vehicles and vehicle bodies after they have been cleaned and brushed by the action of jets of water or cleaning liquid directed thereon so as to eliminate the tedious hand drying operation after the vehicle has been cleansed and to save time and labor in the completion of the vehicle cleaning operation.

Another object of the invention is to provide a drying apparatus particularly applicable to the drying of vehicles and vehicle bodies after they have been washed and cleaned and to provide a drying apparatus which will permit the easy passage of the vehicle through the drying area without reducing or impairing the efficiency of the apparatus.

Another object of the invention is to provide a vehicle and vehicle body drying apparatus in which there is provided a movable drying nozzle for directing a stream of air over the top of the vehicle body as the vehicle passes therebeneath, the movable nozzle thus being allowed to follow the irregular contour of the top of the motor vehicle to insure the proper drying thereof and the removal of all moisture on the various body surfaces.

Another object of the invention is to provide a vehicle drying apparatus which may be used with the vehicle brushing and scrubbing apparatus shown and described in my co-pending application Serial No. 547,837, filed August 3, 1944, so that the vehicle body may be thoroughly dried as it passes from the brushing apparatus.

Other objects and advantages of the invention will become apparent during the course of the following description of the accompanying drawings, wherein:

Figure 2 is a top elevational view of the drying apparatus showing the arrangement of the movable nozzles and location of the stationary nozzles disposed on opposite sides of the vehicle pathway so as to direct a jet of air on the surfaces of the vehicle in a direction opposed to the travel thereof;

Figure 1:
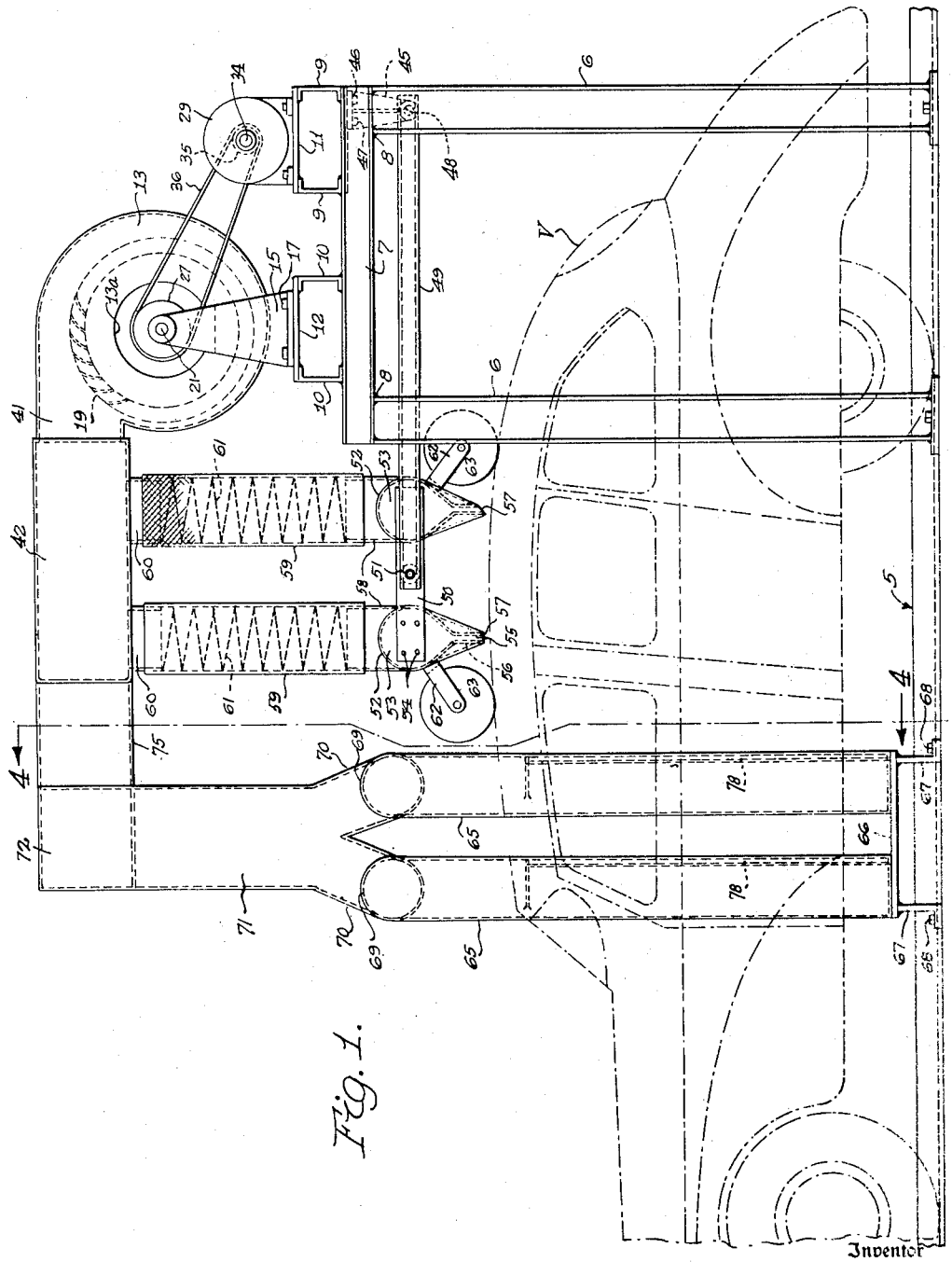
Figure 1 is a side elevational view of the drying apparatus showing the manner in which a vehicle is passed or conveyed therethrough for the purpose of drying the various body surfaces thereof.

Figure 3 is a rear elevational view of the drying apparatus showing the various arrangements and details thereof and illustrating the manner in which the vehicle is passed therethrough for the purpose of drying the same; and Figure 4 is a vertical cross sectional view partly broken away and taken on line 4—4 of Figure 1 looking in the direction of the arrows and further showing the arrangement of the stationary nozzle and jet therein.

In the drawings, the reference character 5 will be employed to designate a pair of spaced channel members forming a vehicle pathway which may be a continuation of a brushing, washing and scrubbing apparatus as shown and described in my copending application upon motor vehicle cleaning apparatus.

Supported above the vehicle pathway or channel members 5 is a drying apparatus adapted to direct currents of air over the vehicle surfaces so as to remove the moisture and water therefrom. The drying apparatus comprises a pair of vertical uprights 6 located on each side of the pathway or channel members 5 and said uprights are of I-beam construction and are connected with a top by means of I-beams 7 welded or otherwise secured in place as at 8. Extending between the I-beams 7 and supported thereon is a pair of channel members 9 and 10 arranged in spaced parallel relation and said channel members are formed of suitable angle bars having opposed pairs of flanges connected by longitudinal plates 11 and 12 respectively.

Mounted on the longitudinal plate 12 is a pair of fan blower casings or fan blowers 13 and 14 having their bases 15 and 16 respectively secured in place by suitable bolts or machine screws as at 18 and being provided with air inlets 13a and 14a respectively. The fan blowers 13 and 14 are provided with rotors 19 and 20 mounted on suitable shafts 21 and 22 supported in bearing extensions 23 and 24 formed integral with the bases 15 and 16. The shafts 21 and 22 are additionally supported by spaced bearing brackets 25 and 26 likewise formed integral with and extending upwardly from the lower bases 15 and 16. Each of the shafts 21 and 22 is provided with a pulley as indicated at 27 and 28 located between the respective bearing arms 23, 25, and 24, 26. Electric motors 29 and 30 are provided for the respective fan blowers 13 and 14 and have their bases 31 and 32 secured to the longitudinal plate 11 on the channel member 9 by bolts or the like as at 33. The armature shaft of the motor 29 as at 34 is provided with a pulley 35 over which is trained a pulley belt 36 for drivingly engaging the pulley 27 of the blower 13, and similarly, the motor 30 has its armature shaft 37 provided with a pulley 38 over which is trained a pulley belt 40 for drivingly engaging the pulley 28 of the fan blower 14. Additional supporting brackets 15a and 16a are secured to the blower casings 13 and 14 respectively and to the longitudinal plate 12 so as to prevent vibration thereof during operation.

The outlet or exhaust 41 of the fan blower 13 is connected to a chamber or housing 42 having branch conduits at the ends thereof as at 43. The housing 42 is provided with an arcuately curved fitting 44 for receiving the outlet or discharge 41 of the fan blower 13 so that the same may be secured thereto by welding or the like or by other suitable fastening means.

Depending from the rearmost channel member 9 is a pair of spaced supporting brackets 45 having their foot portions 46 secured in place by means of bolts or the like as at 47 and said brackets are provided with a bearing portion having relatively short bearing pins 48 for pivotally supporting a pair of rockable channel bars as at 49. The free ends of the channel bars 49 are pivoted to side plate members 50 as at 51 and said side plate members are adapted to support a pair of cylindrical nozzles 52 arranged in spaced apart parallel relation as indicated in Figures 1 and 2. The spray nozzles 52 are elongated and have their end walls 53 secured to the pivoted plates 50 by screws or the like as at 54 so as to swing to and fro with the channel bars 49 when a vehicle V is passed thereunder. The spray nozzles are provided with elongated spray orifices 55 and are provided with end extensions 56 flattened as shown in Figure 1 to provide angularly disposed spray orifices 57. The centralmost portion of each spray nozzle is provided with a coupling collar 58 over which is fitted flexible air conduits 59 which are formed of a suitable flexible fabric such as duck or the like and capable of being extended and contracted in accordion fashion. The upper ends of the flexible fabric conduits 59 are connected to coupling collars 60 depending from the chamber or housing 42 so that the air from the fan blower 13 will pass downwardly through said conduits 59 and into the nozzle 52 and thence through the spray orifices 55 and 57 directly to the surfaces of the vehicle top or other portions of the body of the vehicle V. Coil springs are located with the flexible conduits 59 for holding said conduits extended diametrically and to prevent the collapsing thereof when the spray nozzles 52 are raised or lowered during the passage of a vehicle V therebeneath.

Secured to each spray nozzle 52 is a pair of caster supporting brackets 62 for supporting caster rollers 63, formed of rubber or the like so as to engage the top surface of the vehicle and cause the nozzle to be raised and lowered during the travel of the vehicle therebeneath without marring or scratching the vehicle finish.

It is to be noted that one of the spray orifices 55 and the continuation thereof 57 at the ends thereof are presented in a direction opposed to the vehicle travel so that the stream of air forced therethrough will be blown or directed over the surface instead of directly against it, as in the case of the other spray nozzle 52. Initially, the vehicle will be partially dried by the air passing through the rearmost spray nozzle having the angularly directed jet and the other spray nozzle with a straight jet to direct air substantially downwardly will complete the drying action although the direction of the jets changes during the raising and lowering thereof or the swinging to and fro on the pivoted channel bars 49.

It will thus be seen that the air nozzle 62 will direct air downwardly from the fan blower 13 to dry the top surfaces of the vehicle body and in order to dry the side panels a pair of tubular conduits 65 are disposed on opposite sides of the conveyor pathway or channelway 5 with their lower ends supported by means of a bracket plate 66 welded or otherwise secured to the flange portion of the floor brackets 67 which are secured to the floor by means of anchoring bolts 68. The upper ends of the tubular conduits 65 are connected by horizontal conduits 69 having formed intermediate their length converging branch pipes 70 connected to a common conduit 71. The upper end of the conduit 71 is bent as at 72 and extends laterally as at 73 to one side of the apparatus where it is angularly bent as at 74 so that the free end thereof 75 may be connected to the outlet or discharge duct 76 of the fan blower or blower casing 14.

The tubular conduits 65 are provided with tangentially disposed walls 77 terminating in a longitudinal discharge orifice 78 so as to direct a stream of air in a direction opposed to the direction of vehicle travel as indicated clearly in Figure 2.

It will thus be seen that when the vehicle is passing in the direction indicated in Figure 1, the air from the fan blowers 13 and 14 will be directed over the top and sides through the respective nozzles 52 and tubular conduits 65 so as to complete the drying and remove all moisture from the vehicle body and surfaces thereof after the same has been brushed or scrubbed in a washing or cleaning apparatus as described in my co-pending application Serial No. 547,837 filed August 3, 1944, for Motor vehicle cleaning apparatus.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. A drier for drying the surfaces of motor vehicles after they have been cleaned and washed, comprising a vehicle pathway, a frame structure disposed above said pathway and supported on each side thereof, a pair of pivoted bars carried by the frame structure, a spray nozzle extending between and supported by said pivoted bars to move vertically, means carried by said spray nozzle for engaging the top surface of a vehicle passing along said pathway to move said nozzle vertically and space said nozzle from the surface of said vehicle, said spray nozzle being provided with a discharge opening for directing air downwardly over a vehicle passing along said pathway, a motor blower for supplying said spray nozzle with air, spray nozzles disposed on opposite sides of said pathway for directing a jet of air over the sides of the vehicle body, a motor blower for said second-mentioned spray nozzles, and yielding duct means connecting said first-mentioned spray nozzle with the motor blower therefor.

2. A drier for drying the surfaces of motor vehicles after they have been cleaned and washed, comprising a vehicle pathway, a frame structure disposed above said pathway and supported on each side thereof, a pair of pivoted bars carried by the frame structure, a spray nozzle extending between and supported by said pivoted bars to move vertically, means carried by said spray nozzle for engaging the top surface of a vehicle passing along said pathway to move said nozzle vertically and space said nozzle from the surface of said vehicle, said spray nozzle being provided with a discharge opening for directing air downwardly over a vehicle passing along said pathway, a motor blower for supplying said spray nozzle with air, spray nozzles disposed on opposite sides of said pathway for directing a jet of air over the sides of the vehicle body, a motor blower for said second-mentioned spray nozzles, said motor blower being mounted on the frame structure with the discharge outlets arranged to be connected to said first and second mentioned spray nozzles, and flexible duct members for connecting said first-mentioned spray nozzle with its corresponding motor blower to limit downward movement of said nozzle.

3. A drier for drying the surfaces of motor vehicles after they have been cleaned and washed, comprising a vehicle pathway, a frame structure disposed above said pathway and supported on each side thereof, a pair of pivoted bars carried by the frame structure, a spray nozzle extending between and supported by said pivoted bars to move vertically, said spray nozzle being provided with a discharge opening for directing air downwardly over a vehicle passing along said pathway, a motor blower for supplying said spray nozzle with air, spray nozzles disposed on opposite sides of said pathway for directing a jet of air over the sides of the vehicle body, rollers carried by the first-mentioned spray nozzle for engaging the vehicle body and holding the discharge orifice in spaced relation therefrom during the travel of said vehicle along said pathway, and a flexible duct connecting said first-mentioned spray nozzle with the motor blower therefor, said flexible duct being arranged to limit the downward movement of said first-mentioned spray nozzle.

4. A drier for drying the surfaces of motor vehicles after they have been cleaned and washed, comprising a vehicle pathway, a frame structure disposed above said pathway and supported on each side thereof, a pair of pivoted bars carried by the frame structure, a spray nozzle extending between and supported by said pivoted bars to move vertically, means carried by said spray nozzle for engaging the top surface of a vehicle passing along said pathway to move said nozzle vertically and space said nozzle from the surface of said vehicle, said spray nozzle being provided with a discharge opening for directing air downwardly over a vehicle passing along said pathway, a motor blower for supplying said spray nozzle with air, spray nozzles disposed on opposite sides of said pathway for directing a jet of air over the sides of the vehicle body, a flexible conduit connecting said first-mentioned spray nozzle with its corresponding motor blower to permit said vertical movement of said nozzle during the travel of said vehicle along said pathway.

5. A drier for drying the surfaces of motor vehicles after they have been cleaned and washed, comprising a vehicle pathway, a frame structure disposed above said pathway and supported on each side thereof, a pair of pivoted bars carried by the frame structure, a spray nozzle extending between and supported by said pivoted bars to move vertically, said spray nozzle being provided with a discharge opening for directing air downwardly over a vehicle passing along said pathway, a motor blower for supplying said spray nozzle with air, spray nozzles disposed on opposite sides of said pathway for directing a jet of air over the sides of the vehicle body, rollers carried by the first-mentioned spray nozzle for engaging the vehicle body thereby moving said spray nozzle vertically and holding the discharge orifice in spaced relation therefrom during the travel of said vehicle along said pathway, and a flexible conduit connecting said first-mentioned spray nozzle with its corresponding motor blower to permit said vertical movement of said nozzle during the travel of said vehicle along said pathway, said motor blower being mounted on the frame structure with the discharge outlets thereof connected to said first and second mentioned spray nozzles.

6. A drying apparatus for motor vehicles, comprising a vehicle pathway, a frame structure supported above said pathway, an elongated nozzle extending transversely of said pathway and having elongated orifice means therein with a substantially horizontal central orifice portion and downwardly and inwardly inclined end orifice portions on opposite sides of said central portion for directing a jet of air downwardly over the upper portion and downwardly curved edge portions of the top of a vehicle passing along said pathway, an air blower located on said frame structure for supplying air to said nozzle, and a flexible conduit connecting said nozzle with said blower to permit vertical movement of said nozzle during the travel of said vehicle along said pathway.

7. A drying apparatus for motor vehicles, comprising a vehicle pathway, a frame structure supported above said pathway, an elongated nozzle extending transversely of said pathway and having elongated orifice means therein with downwardly and inwardly inclined orifice portions on opposite sides of the center thereof for directing a jet of air downwardly over the upper portion and downwardly curved edge portions of the top of a vehicle passing along said pathway, an air blower mounted on said frame structure for supplying air to said nozzle, and a flexible conduit connecting said nozzle with said blower to permit vertical movement of said nozzle during the travel of said vehicle along said pathway.

L. J. ROUSSEAU.

REFERENCES CITED

The following references are of record in the file of this patent:

UNITED STATES PATENTS

| Number | Name | Date |
| --- | --- | --- |
| 624,287 | Bernner | Jan. 30, 1900 |
| 1,562,762 | Harris | Nov. 24, 1925 |
| 1,697,879 | Olson | Jan. 8, 1929 |
| 1,700,994 | Buck | Feb. 5, 1929 |
| 2,040,884 | Somes | May 19, 1936 |
| 2,132,303 | Lathrop | Oct. 4, 1938 |
| 2,177,016 | Brizard | Oct. 24, 1939 |
| 2,334,854 | Zadenach | Nov. 23, 1943 |
| 2,345,636 | Stickler | Apr. 4, 1944 |
| 2,385,962 | Barnett | Oct. 2, 1945 |